(12) United States Patent
Wang et al.

(10) Patent No.: US 9,584,410 B2
(45) Date of Patent: Feb. 28, 2017

(54) SYSTEM AND METHOD FOR SELECTING LAYER-2 ADAPTER

(71) Applicants: Jinlin Wang, Beijing (CN); Lingfang Wang, Beijing (CN); Jiali You, Beijing (CN); Feng Deng, Beijing (CN)

(72) Inventors: Jinlin Wang, Beijing (CN); Lingfang Wang, Beijing (CN); Jiali You, Beijing (CN); Feng Deng, Beijing (CN)

(73) Assignee: Institute of Acoustics, Chinese Academy of Sciences (CN)

( * ) Notice: Subject to any disclaimer, the term of this patent is extended or adjusted under 35 U.S.C. 154(b) by 65 days.

(21) Appl. No.: 14/405,223

(22) PCT Filed: Dec. 28, 2012

(86) PCT No.: PCT/CN2012/087895
§ 371 (c)(1),
(2) Date: Dec. 3, 2014

(87) PCT Pub. No.: WO2014/089888
PCT Pub. Date: Jun. 19, 2014

(65) Prior Publication Data
US 2015/0180770 A1    Jun. 25, 2015

(30) Foreign Application Priority Data

Dec. 14, 2012 (CN) .......................... 2012 1 0544561

(51) Int. Cl.
*H04L 12/721* (2013.01)
*H04L 12/747* (2013.01)
(Continued)

(52) U.S. Cl.
CPC ............ *H04L 45/66* (2013.01); *H04L 45/742* (2013.01); *H04L 69/22* (2013.01); *H04W 36/005* (2013.01); *H04W 80/02* (2013.01)

(58) Field of Classification Search
None
See application file for complete search history.

(56) References Cited

U.S. PATENT DOCUMENTS

| 7,613,127 B2* | 11/2009 | Jonnala | H04L 69/24 370/252 |
| 2011/0083048 A1* | 4/2011 | Yan | H04W 36/0016 714/57 |
| 2011/0261720 A1* | 10/2011 | Diab | H04L 41/0873 370/254 |

FOREIGN PATENT DOCUMENTS

| CN | 101115006 | 1/2008 |
| CN | 101132365 | 2/2008 |

(Continued)

*Primary Examiner* — Anh Ngoc Nguyen
(74) *Attorney, Agent, or Firm* — Jack Schwartz & Associates, PLLC

(57) ABSTRACT

The present invention relates to a Layer 2 adapter selecting system, including a Layer 3 packet requirements extracting module, a destination Layer 2 address acquiring module, a Layer 2 adapter metric acquiring module, an appropriate Layer 2 adapter identifier selecting module, a packet caching module and a packet scheduling module; wherein the packet caching module is configured to cache a received Layer 3 packet; the Layer 3 packet requirements extracting module is configured to read the Layer 3 packet and extract the type and a parameter value of the requirements; the Layer 2 adapter metric acquiring module is configured to acquire instant metric parameter values of each of the adapters; the appropriate Layer 2 adapter identifier selecting module calculates an adapter identifier and a Layer 3 packet metric; the destination Layer 2 address acquiring module is configured to acquire a Layer 2 address of each of the adapters associated with a destination Layer 3 address; and the packet scheduling module calls an external Layer 2 adapter driver, and the Layer 2 adapter driver completes packaging and sending of the packet. The present invention may solve the (Continued)

problem of resource waste of multiple links, so that the multiple links may be used dynamically in parallel.

7 Claims, 3 Drawing Sheets

(51) Int. Cl.
 *H04L 29/06* (2006.01)
 *H04W 36/00* (2009.01)
 *H04W 80/02* (2009.01)

(56) References Cited

FOREIGN PATENT DOCUMENTS

| | | |
|---|---|---|
| CN | 101325551 | 12/2008 |
| JP | 2006-261806 | 9/2006 |

\* cited by examiner

SYSTEM AND METHOD FOR SELECTING LAYER-2 ADAPTER

FIELD OF THE INVENTION

The present invention relates to the field of network communications, and particularly, relates to a Layer 2 adapter selecting system and method.

BACKGROUND OF THE INVENTION

With the rapid development of internet, network operators generally deploy redundant links in consideration of network reliability, and the redundant links have two types, namely homogeneous ones and heterogeneous ones. Whatever type of redundant links is adopted, the redundant links and original ones are not included within the same transmission path; and under normal conditions, only one of two or more links between a source and a destination runs normally, so, huge waste of the link resources will be caused.

If the redundant links are arranged in a network, multiple Layer 2 adapters need to be provided at the source and the destination, but the protocols used on the layers above Layer 2 are the same. In addition, multiple adapters have been provided in terminals in practice. Accordingly, under packet switching manner, the problem of selecting the multiple Layer 2 adapters will occur. In the prior art, if the multiple Layer 2 adapters have the same Layer 3 address, then only one adapter is activated within a time period in the selecting process of the Layer 2 adapters, which leads to the waste of the link resources.

SUMMARY OF THE INVENTION

To overcome the problem that the selecting methods of the existing Layer 2 adapters are prone to cause waste of link resources, the present invention provides a Layer 2 adapter selecting system and method.

To fulfill the above-mentioned object, the present Layer 2 adapter selecting system includes: a Layer 3 packet requirements extracting module, a destination Layer 2 address acquiring module, a Layer 2 adapter metric acquiring module, an appropriate Layer 2 adapter identifier selecting module, a packet caching module and a packet scheduling module; wherein, the packet caching module is configured to cache a received Layer 3 packet;

the Layer 3 packet requirements extracting module is configured to read the Layer 3 packet from the packet caching module, extract the type and parameter value of a requirements from the Layer 3 packet and transmit the obtained results to the appropriate Layer 2 adapter identifier selecting module;

the Layer 2 adapter metric acquiring module is configured to acquire instant metric parameter values of each of the adapters and transmit the obtained results to the appropriate Layer 2 adapter identifier selecting module;

the appropriate Layer 2 adapter identifier selecting module calculates an adapter identifier and a Layer 3 packet metric according to the type and parameter value of the requirements calculated by the Layer 3 packet requirements extracting module and each adapter metric value calculated by the Layer 2 adapter metric acquiring module, transmits the resulted adapter identifier and the Layer 3 packet metric to the packet scheduling module, determines the link corresponding to the adapter is a unidirectional link or a bidirectional link according to the obtained adapter identifier, and if the link is a unidirectional link, then performs parameter negotiation through a bidirectional link to obtain a unidirectional link destination address mapping parameter, and transmits the mapping parameter to an external destination Layer 2 adapter through the bidirectional link;

the destination Layer 2 address acquiring module is configured to acquire a Layer 2 address of each of the adapters associated with a destination Layer 3 address;

the packet scheduling module calls an external Layer 2 adapter driver according to the adapter identifier and Layer 3 packet metric obtained by the appropriate Layer 2 adapter identifier selecting module, wherein the Layer 2 adapter driver performs packaging and sending of the packet.

In the above technical solution, when the destination Layer 2 address acquiring module acquires the Layer 2 address of a destination adapter, if a data link is a bidirectional link, the source adapter interacts with the destination adapter through a Layer 2 data frame to obtain the Layer 2 address of the destination adapter; and if a data link is a unidirectional link, then the source and destination of another bidirectional link perform parameter negotiation to obtain a mapping parameter of the unidirectional link destination, after which the source transmits the mapping parameter of the unidirectional link destination to the destination through the bidirectional link.

In the above technical solution, the requirements is an metric to be satisfied for the packet transmission.

The present invention also provides a Layer 2 adapter selecting method implemented on the present Layer 2 adapter selecting system, which includes:

Step 1): after a Layer 3 packet is received, extracting the requirements from the received Layer 3 packet to obtain the type and the parameter value of the requirements;

step 2): acquiring the instant metric parameter values of each of the adapters;

step 3): calculating an adapter identifier and a Layer 3 packet metric according to the type and parameter value of the requirements obtained in step 1) and the metric parameter values of each of the adapters obtained in step 2);

step 4): scheduling the Layer 3 packet according to the adapter identifier and Layer 3 packet metric obtained in step 3) so as to call a corresponding Layer 2 adapter driver;

step 5): judging the link corresponding to each of the adapters is a unidirectional link or a bidirectional link, if the link is a unidirectional link, executing step 6), otherwise, executing step 7);

step 6): performing parameter negotiation through the source and the destination of a bidirectional link to obtain a unidirectional link destination address mapping parameter, after which the source sending the obtained address mapping parameter to a destination Layer 2 adapter through the bidirectional link, and then executing step 8);

step 7): the source adapter and the destination adapter interacting with each other through a Layer 2 data frame, so as to obtain a Layer 2 address of the destination adapter;

step 8): the Layer 2 adapter driver of the source adapter performing the packaging and sending of the packet.

In the above method, step 1) includes:
the packaging and sending of the packet.

In the above method, step 1) includes:

step 1-1): extracting the requirements field from the header of the Layer 3 packet;

step 1-2): extracting the type of the requirements from the requirements field, and if the requirements is of a single type, then decomposing the requirements field to obtain a single parameter; and if the requirements is of a composite type, then decomposing the requirements field to obtain a plurality of parameters, further running an algorithm involving each of the obtained parameters to obtain a single dimensionless value.

In the above method, in step 2), acquiring the instant metric parameter values of each of the adapters includes obtaining, from the Layer 2 adapter driver, various indices of a Layer 2 adapter link channel, including average packet transmission time, link rate and packet loss rate.

In the above method, step 3) includes:

Implementing an function on the single metric or calculated composite indices of each Layer 2 adapter obtained in step 2) according to the type and parameter value of the requirements obtained in step 1) to obtain an identifier of the Layer 2 adapter meeting the requirements; wherein, the function is a scalar-type function in the form $f=fun(x_1, x_2, \ldots, x_n)$, wherein fun is a single-valued function, and $x_1$, $x_2 \ldots x_n$ represent the indices of the Layer 2 adapter.

The advantages of the present invention lie in that the Layer 2 adapter selecting system and method in the present invention overcomes the problem of waste of multiple link resources so that the multiple links

DETAILED DESCRIPTION OF THE EMBODIMENT

The present invention will be further described in conjunction with the accompanying drawings now.

Figure 1:
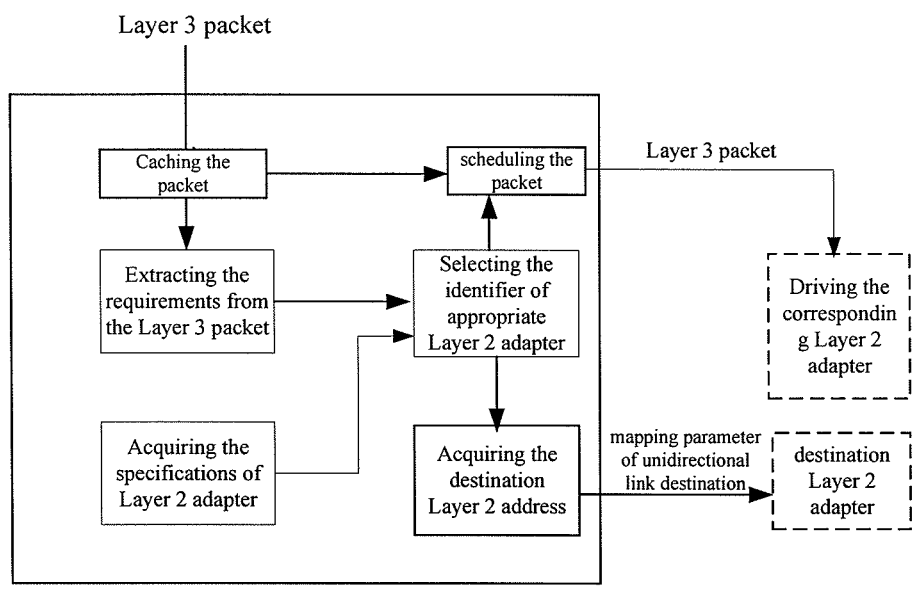
FIG. 1 is a structural diagram of a Layer 2 adapter selecting system of the present invention.

With reference to FIG. 1, a Layer 2 adapter selecting system of the present invention includes core modules and auxiliary modules, wherein the core modules include a Layer 3 packet requirements extracting module, a destination Layer 2 address acquiring module, a Layer 2 adapter metric acquiring module and an appropriate Layer 2 adapter identifier selecting module; and the auxiliary modules include a packet caching module and a packet scheduling module.

The packet caching module is configured to cache a received Layer 3 packet.

The Layer 3 packet requirements extracting module is configured to read the Layer 3 packet from the packet caching module, extract the type of and parameter value of the requirements from the Layer 3 packet and transmit the obtained results to the appropriate Layer 2 adapter identifier selecting module. Wherein, the requirements refers to indices to be satisfied for the packet transmission, such as the shortest transmission time, the maximum bandwidth and lowest packet loss rate, or transmission time threshold, bandwidth threshold and packet loss rate threshold, or a function value obtained after each of the parameters are calculated, and the like.

The Layer 2 adapter metric acquiring module is configured to acquire instant metric parameter values of each of the adapters and transmit the obtained results to the appropriate Layer 2 adapter identifier selecting module.

The appropriate Layer 2 adapter identifier selecting module calculates an adapter identifier and a Layer 3 packet metric according to the type and parameter value of the requirements calculated by the Layer 3 packet requirements extracting module and each adapter metric value calculated by the Layer 2 adapter metric acquiring module, transmits the adapter identifier and the Layer 3 packet metric to the packet scheduling module, determines the link corresponding to the adapter is a unidirectional link or a bidirectional link according to the obtained adapter identifier, and if the link is a unidirectional link, then performs parameter negotiation through a bidirectional link so as to obtain a unidirectional link destination address mapping parameter, and sends the mapping parameter to an external destination Layer 2 adapter through the bidirectional link, so that the destination can implement a receiving operation. However, if the link is a bidirectional link, the parameter negotiation operation is not needed.

The destination Layer 2 address acquiring module is configured to acquire a Layer 2 address of each of the adapters associated with a destination Layer 3 address. When the destination Layer 2 address acquiring module acquires the Layer 2 address of a destination adapter, if a data link is a bidirectional link, the a source adapter interacts with the destination adapter through a Layer 2 data frame to obtain the Layer 2 address of the destination adapter; and if a data link is a unidirectional link, then the source and destination of another bidirectional link perform parameter negotiation to obtain a mapping parameter of the unidirectional link destination, after which the source transmits the mapping parameter of the unidirectional link destination to the destination through the bidirectional link.

The packet scheduling module calls an external Layer 2 adapter driver according to the adapter identifier and Layer 3 packet metric obtained by the appropriate Layer 2 adapter identifier selecting module, and the Layer 2 adapter driver performs the packaging and sending of the packet.

Figure 2:
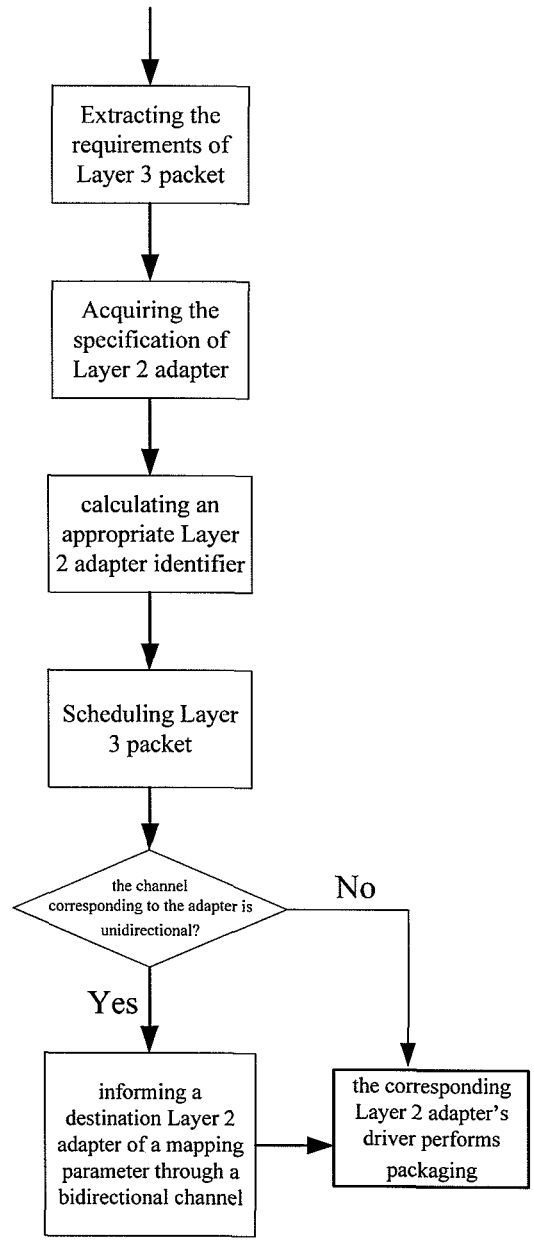
FIG. 2 is a flowchart of a Layer 2 adapter selecting method of the present invention.

The Layer 2 adapter selecting system of the present invention has been described above, and a corresponding Layer 2 adapter selecting method will be illustrated below based on the system in conjunction with FIG. 2.

Step 1): after a Layer 3 packet is received, extracting a requirements from the received Layer 3 packet to obtain the type and the parameter value of the requirements;

the requirements refers to indices to be satisfied for the packet transmission, such as the shortest transmission time, the maximum bandwidth and lowest packet loss rate, or transmission time threshold, bandwidth threshold and packet loss rate threshold, or a function value obtained after each of the parameters are calculated, and the like.

step 2): acquiring the instant metric parameter values of each of the adapters;

step 3): calculating an adapter identifier and a Layer 3 packet metric according to the type and parameter value of the requirements obtained in step 1) and the metric parameter values of each of the adapters obtained in step 2);

step 4): scheduling the Layer 3 packet according to the adapter identifier and Layer 3 packet metric obtained in step 3) so as to call a corresponding Layer 2 adapter driver;

step 5): judging the link corresponding to each of the adapters is a unidirectional link or a bidirectional link, if the link is a unidirectional link, executing step 6), otherwise, executing step 7);

step 6): performing parameter negotiation through the source and the destination of a bidirectional link to obtain a unidirectional link destination address mapping parameter, after which the source sending the obtained address mapping parameter to a destination Layer 2 adapter through the bidirectional link, and then executing step 8);

step 7): the source adapter and the destination adapter interacting with each other through a Layer 2 data frame, so as to obtain a Layer 2 address of the destination adapter;

step 8): the Layer 2 adapter driver of the source adapter performing the packaging and sending of the packet.

The present method has been described in general as above, and some of the steps therein will be described further in the following.

Step 1) includes:

step 1-1): extracting the requirements field from the header of the Layer 3 packet;

step 1-2): extracting the type of the requirements from the requirements field, and if the requirements is of a single type, then decomposing the requirements field to obtain a single parameter; and if step 1-2): extracting the type of the requirements from the requirements field, and if the requirements is of a single type, then decomposing the requirements field to obtain a single parameter; and if the requirements is of a composite type, then decomposing the requirements field to obtain a plurality of parameters, further running an algorithm involving each of the obtained parameters to obtain a single dimensionless value.

Step 2) includes: obtaining, from the Layer 2 adapter driver, various indices of a Layer 2 adapter link channel, including average packet transmission time, link rate and packet loss rate.

Step 3) includes:

Implementing an function on the single metric or calculated composite indices of each Layer 2 adapter obtained in step 2) according to the type and parameter value of the requirements obtained in step 1) to obtain an identifier of the Layer 2 adapter meeting the requirements; wherein, the function is a scalar-type function in the form $f=\text{fun}(x_1, x_2, \ldots, x_n)$, wherein fun is a single-valued function, and $X_1$, $x_2 \ldots x_n$ represent the indices of the Layer 2 adapter.

Figure 3:
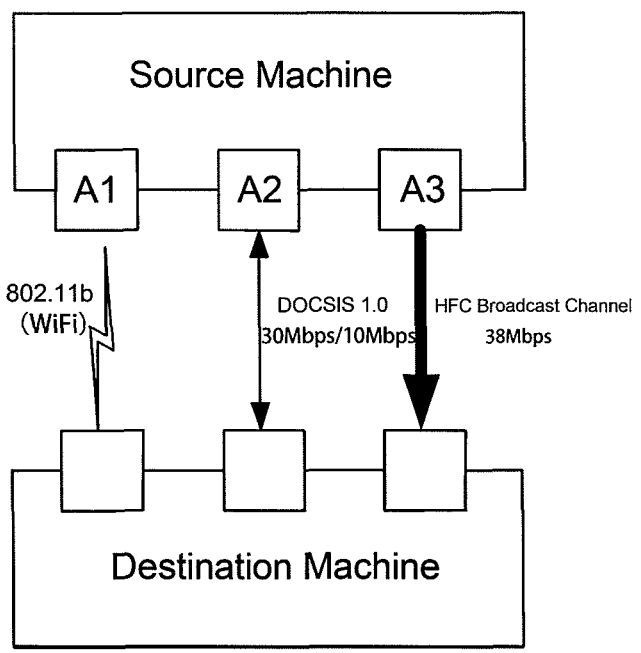
FIG. 3 is a schematic diagram of a scenario described in an embodiment.

The Layer 2 adapter selecting method of the present invention will be illustrated below in conjunction with a scenario of FIG. 3. In this scenario, the source is provided with three adapters A1, A2 and A3, which are 802.11b(WiFi) modulator, DOCSIS 1.0 modulator and unidirectional HFC QAM modulator respectively, whose interface rates are 11 Mbps, 30 Mbps and 38 Mbps respectively. Assuming the Layer 3 packet is an IP packet (may also be another type, such as IPX), the requirements, such as the maximum bandwidth (the bandwidth is taken as an example for selected, so the adapter identifier is A3. At the same time, adapter A3 is decided as connected to a unidirectional link, so corresponding unidirectional received parameters (such as a frequency point and a PID, the process of determining these parameters relates to negotiation of a bidirectional adapter such as the A2 and a destination adapter) of a destination are transmitted to the destination through the bidirectional adapter A2, thereafter the IP packet is sent to the adapter A3, which will encapsulate and send the Layer 2 packet.

It should be noted that the preceding embodiments are merely used for illustrating the technical solutions of the present invention, rather than limiting the present invention. Though the present invention is illustrated in detail with reference to the preceding embodiments, it should be understood by those of ordinary skill in the art that modifications or equivalent substitutions may be made to the technical solutions of the present invention, and these modifications or substitutions do not depart from the spirit and scope of the technical solutions of the present invention and should fall into the scope of the claims of the present invention

The invention claimed is:

1. A method for selecting between Layer 2 adapters, the method comprising:
   caching a received Layer 3 packet;
   reading the Layer 3 packet;
   extracting the type and parameter value of a requirements from the Layer 3 packet;
   transmitting the obtained results;
   acquiring instant metric parameter values of each of the Layer 2 adapters;
   transmitting obtained results;
   calculating an adapter identifier and a Layer 3 packet metric according to the extracted type and parameter value of the requirements and each calculated adapter metric value, transmitting the resultant adapter identifier and the Layer 3 packet metric, determining whether a link corresponding to an external destination Layer 2 adapter is a unidirectional link or a bidirectional link according to the obtained adapter identifier, and if the link is a unidirectional link, performing parameter negotiation through a bidirectional link to obtain a unidirectional link destination address mapping parameter, and transmitting the mapping parameter to an external destination Layer 2 adapter through the bidirectional link;
   acquiring a Layer 2 address of each adapter associated with a destination Layer 3 address;
   calling an external Layer 2 adapter driver according to the adapter identifier and Layer 3 packet metric, wherein the Layer 2 adapter driver performs packaging and sending of the packet.

2. The method according to claim 1, wherein, when a Layer 2 address of a destination adapter is acquired, if a data link is a bidirectional link, then a source adapter interacts with the destination adapter through a Layer 2 data frame to obtain the Layer 2 address of the destination adapter; and if a data link is a unidirectional link, the source and destination of an other bidirectional link perform parameter negotiation to obtain a mapping parameter of the unidirectional link, after which the source transmits the mapping parameter of the unidirectional link destination to the destination through the other bidirectional link.

3. The method according to claim 1, wherein the requirements is a metric to be satisfied for the packet transmission.

4. A Layer 2 adapter selecting method, the method including:
   after a Layer 3 packet is received, extracting the requirements from the received Layer 3 packet to obtain the type and the parameter value of the requirements;
   acquiring the instant metric parameter values of each of the adapters;
   calculating an adapter identifier and a Layer 3 packet metric according to the type and parameter value of the requirements obtained during extracting and the acquired instant metric parameter values of each of the adapters;
   scheduling the Layer 3 packet according to the calculated adapter identifier and Layer 3 packet metric to call a corresponding Layer 2 adapter driver;
   determining if the link corresponding to each of the adapters is a unidirectional link or a bidirectional link,
   if the link is a unidirectional link, performing parameter negotiation through the source and the destination of a bidirectional link to obtain a unidirectional link destination address mapping parameter, after which the source sending the obtained address mapping parameter to a destination Layer 2 adapter through the bidirectional link; or if the link is a unidirectional link, the source adapter and the destination adapter interacting with each other through a Layer 2 data frame to obtain a Layer 2 address of the destination adapter; and packaging and sending of the packet by the Layer 2 adapter driver of the source adapter.

5. The method according to claim 4, wherein extracting the requirements from the received Layer 3 packet includes:

extracting the requirements field from the header of the Layer 3 packet; and extracting the type of the requirements from the requirements field, wherein if the requirements is of a single type, decomposing the requirements field to obtain a single parameter; and if the requirements is of a composite type, decomposing the requirements field to obtain a plurality of parameters, further running an algorithm involving each of the obtained parameters to obtain a single dimensionless value.

6. The method according to claim 4, wherein acquiring the instant metric parameter values of each of the adapters includes obtaining, from the Layer 2 adapter driver, various indices of a Layer 2 adapter link channel, including average packet transmission time, link rate and packet loss rate.

7. The method according to claim 4, wherein calculating an adapter identifier and a Layer 3 packet metric includes:

implementing a function algorithm on single metric or calculated composite indices acquired for each Layer 2 according to the extracted type and parameter value of the requirements to obtain an identifier of the Layer 2 adapter meeting the requirements; wherein, the function algorithm is a scalar-type function $f=\text{fun}(x_1, x_2, \ldots, x_n)$, wherein fun is a single-valued function, and $x_1, x_2 \ldots x_n$ represent indices of the Layer 2 adapter.

* * * * *